United States Patent [19]
Cetinkaya et al.

[11] Patent Number: 4,927,606
[45] Date of Patent: May 22, 1990

[54] FCC STRIPPING APPARATUS

[75] Inventors: Ismail B. Cetinkaya, Palatine; Robert P. Culler, Clarendon Hills, both of Ill.

[73] Assignee: UOP, Des Plaines, Ill.

[21] Appl. No.: 101,225

[22] Filed: Nov. 6, 1987

Related U.S. Application Data

[63] Continuation-in-part of Ser. No. 867,972, May 29, 1986, abandoned.

[51] Int. Cl.$^5$ .............................. B01J 8/24; B01J 8/44
[52] U.S. Cl. .................................... 422/144; 422/143; 422/228
[58] Field of Search .............. 422/144, 143, 223, 224, 422/228; 34/171; 55/60, 61; 502/34

[56] References Cited

U.S. PATENT DOCUMENTS

| | | | |
|---|---|---|---|
| 2,460,151 | 1/1949 | Sinclair | 422/223 X |
| 2,994,659 | 8/1961 | Slyngstad et al. | 422/144 |
| 2,997,374 | 8/1961 | Lavender et al. | 422/220 |
| 3,022,054 | 2/1962 | Kotzebue | 422/255 X |
| 3,027,244 | 3/1962 | Byrne et al. | 422/218 |
| 3,649,215 | 3/1972 | Perga et al. | 422/177 X |
| 4,229,417 | 10/1980 | Kanai et al. | 261/93 X |
| 4,605,491 | 8/1986 | Haddad et al. | 208/153 X |
| 4,629,552 | 12/1986 | Haddad et al. | 208/153 X |

Primary Examiner—Barry S. Richman
Assistant Examiner—Amalia L. Santiago
Attorney, Agent, or Firm—Thomas K. McBride; John G. Tolomei

[57] ABSTRACT

This invention provides an improved apparatus for stripping hydrocarbons from spent catalyst which has been used in effecting hydrocarbon conversion reactions prior to the regeneration of this catalyst by combustion of carbon deposits upon the catalyst. The invention is described in terms of its use in FCC processes, since such processes are the most common application of the invention. In order to better distribute stripping gas, which is normally steam, so that the gas contacts and passes through substantially all of the catalyst, distribution ports are added to the skirts of the stripper baffles which direct catalyst flow in a generally side-to-side manner as it moves downward through a stripping vessel. The ports are sized to vary penetration of the stripping gas into the stream catalyst that moves past the grids. Use of these ports increases the amount of hydrocarbons removed from the spent catalyst and/or decreases stripping gas requirements.

4 Claims, 3 Drawing Sheets

FCC STRIPPING APPARATUS

CROSS-REFERENCE TO RELATED APPLICATION

This application is a continuation-in-part of prior copending application Ser. No. 867,972 filed May 29, 1986 now abandoned, the contents of which are incorporated herein by reference thereto.

FIELD OF THE INVENTION

This invention relates broadly to hydrocarbon conversion processes and apparatus. More specifically, the invention relates to an apparatus and method for stripping hydrocarbons from spent catalyst in a fluidized catalytic cracking process.

BACKGROUND INFORMATION

Fluidized bed catalytic cracking (commonly referred to as FCC) processes were developed during the 1940's to increase the quantity of naphtha boiling range hydrocarbons which could be obtained from crude oil. Fluidized catalytic cracking processes are now in widespread commercial use in petroleum refineries to produce lighter boiling point hydrocarbons from heavier feedstocks such as atmospheric reduced crudes or vacuum gas oils. Such processes are utilized to reduce the average molecular weight of various petroleum-derived feed streams and thereby produce lighter products, which have a higher monetary value than heavy fractions. Though the feed to an FCC process is usually a petroleum-derived material, liquids derived from tar sands, oil shale or coal liquefaction may be charged to an FCC process. Today, FCC processes are also used for the cracking of heavy oil and reduced crudes. Although these processes are often used as reduced crude conversion, use of the term FCC in this description applies to heavy oil cracking processes as well.

Differing designs of FCC units may be seen in the articles at page 102 of the May 15, 1972 edition and at page 65 of the October 8, 1973 edition of "The Oil & Gas Journal".

Other examples of FCC processes can be found in U.S. Pat. Nos. 4,364,905 (Fahrig et al.); 4,051,013 (Strother); 3,894,932 (Owen); and 4,419,221 (Castagnos, Jr. et al.) and the other FCC patent references discussed herein.

An FCC process of the most common design involves contacting a charge stock in a reaction zone with a finely divided solid catalytic material which is pneumatically conveyed through the reaction zone by a fluidizing medium. The fluidizing medium can include steam, light and vaporized feed components which are converted by contact with the catalyst. The catalyst is described as being in a fluidized state because it behaves as a fluid while it is transported by the fluidizing medium. Contact of the catalyst particles with the feed covers the catalyst with a hydrocarbonaceous material referred to as coke. Coke is a by-product of the cracking reaction and is comprised of carbon, hydrogen, and other materials present in the feed, such as sulfur. Coke blocks cracking sites on the catalyst and deactivates the catalyst. Such catalyst is generally referred to as spent catalyst. Therefore, after passage through the reaction zone, spent catalyst is transferred to a regeneration zone where the coke is removed from the catalyst by combustion. An oxygen-containing gas, typically air, is mixed with the catalyst in the regenerator at sufficient temperature to initiate the oxidation of the coke deposits to carbon monoxide and carbon dioxide. Removal of coke via oxidation reactivates the catalyst which is withdrawn from the regenerator and returned to the reactor to complete the continuous operation of the FCC unit.

A majority of the hydrocarbon vapors that contact the catalyst in the reaction zone are separated from the solid particles by ballistic and/or centrifugal separation methods. However, the catalyst particles employed in an FCC process have a large surface area, which is due to a great multitude of pores located in the particles. As a result, the catalytic materials retain hydrocarbons within their pores and upon the external surface of the catalyst. Although the quantity of hydrocarbon retained on each individual catalyst particle is very small, the large amount of catalyst and the high catalyst circulation rate which is typically used in a modern FCC process results in a significant quantity of hydrocarbons being withdrawn from the reaction zone with the catalyst.

Therefore, it is common practice to remove, or strip, hydrocarbons from spent catalyst prior to passing it into the regeneration zone. It is important to remove retained spent hydrocarbons from the spent catalyst for process and economic reasons. First, hydrocarbons that entered the regenerator increase its carbon-burning load and can result in excessive regenerator temperatures. Stripping hydrocarbons from the catalyst also allows recovery of the hydrocarbons as products. Avoiding the unnecessary burning of hydrocarbons is especially important during the processing of heavy (relatively high molecular weight) feedstocks, since processing these feedstocks increases the deposition of coke on the catalyst during the reaction (in comparison to the coking rate with light feedstocks) and raises the combustion load in the regeneration zone. Higher combustion loads lead to higher temperatures which at some point may damage the catalyst or exceed the metallurgical design limits of the regeneration apparatus.

The most common method of stripping the catalyst passes a stripping gas, usually steam, through a flowing stream of catalyst, countercurrent to its direction of flow. Such steam stripping operations, with varying degrees of efficiency, remove the hydrocarbon vapors which are entrained with the catalyst and hydrocarbons which are absorbed on the catalyst.

Stripping of hydrocarbon vapors from the catalyst requires only contact of the catalyst with a stripping medium. This contact may be accomplished in a simple open vessel as demonstrated by U.S. Pat. No. 4,481,103.

In the past, the efficiency of catalyst stripping has been increased by using a series of baffles in a stripping apparatus to cascade the catalyst from side to side as it moves down the stripping apparatus. Moving the catalyst horizontally increases contact between it and the stripping medium. Increasing the contact between the stripping medium and catalyst removes more hydrocarbons from the catalyst.

As shown by U.S. Pat. No. 2,440,625, the use of angled guides for increasing contact between the stripping medium and catalyst has been known since 1944. In these arrangements, the catalyst is given a labyrinthine path through a series of baffles located at different levels. Catalyst and gas contact is increased by this arrangement that leaves no open vertical path of significant cross-section through the stripping apparatus. Further examples of similar stripping devices for FCC units are shown in U.S. Pat. Nos. 2,440,620; 2,612,438; 3,894,932; 4,414,100; and 4,364,905. These references show the typical stripper arrangement having a stripper vessel, a series of baffles in the form of frusto-conical sections that direct the catalyst inward onto a baffle in a series of centrally located conical or frusto conical baffles that divert the catalyst outward onto the outer baffles. The stripping medium enters from below the lower baffle in the series and continues rising upward from the bottom of one baffle to the bottom of the next succeeding baffle. Variations in the baffles include the addition of skirts about the trailing edge of the baffle as depicted in U.S. Pat. No. 2,994,659 and the use of multiple linear baffle sections at different baffle levels as demonstrated by FIG. 3 of U.S. Pat. No. 4,500,423. A variation in introducing the stripping medium is shown in U.S. Pat. No. 2,541,801 where a quantity of fluidizing gas is admitted at a number of discrete locations.

In another form of gas-solid contact apparatus, presented in U.S. Pat. No. 2,460,151 (Sinclair), it has been shown that upward flowing reactants or vapors can be collected underneath a series of troughs and vented out the sides of the troughs through a series of louvers. However, this apparatus will not function in the manner of the previously described stripping devices since its arrangement provides a checkerboard pattern of open vertical passages through all trough levels. The '151 patent also attaches no particular importance to the design or provision of the louvers in the sides of the troughs.

In order to achieve good stripping of the catalyst and the increased product yield and enhanced regenerator operation associated therewith, relatively large amounts of stripping medium have been required. For the most common stripping medium, steam, the average requirement throughout the industry is well above 1.5 kg of steam per 1000 kg of catalyst for thorough catalyst stripping. The costs associated with this addition of fluidizing medium are significant. In the case of steam, the costs include capital expenses and utility expenses associated with supplying the steam and removing the resulting water via downstream separation facilities. Therefore, any reduction in the amount of steam required to achieve good catalyst stripping will yield substantial economic benefits to the FCC process.

It has now been discovered that good catalyst stripping can be achieved using conventional FCC stripping methods and devices with up to one-half or less of the stripping medium that was formerly used. These results are achieved by modifying the stripper grids in accordance with this invention.

BRIEF SUMMARY OF THE INVENTION

This invention is an FCC stripper that at each grid level redistributes the fluidizing medium to increase its penetration across the downward flowing catalyst stream. A carefully sized and spaced pattern of holes at the bottom of each grid injects the fluidizing medium into and across the descending column of catalyst particles. Injection of the fluidizing medium forces it to contact more catalyst particles so that the fluidizing medium more effectively removes hydrocarbons from the catalyst. The more efficient stripping will reduce the required stripping gas for a constant level of hydrocarbon removal or increase the hydrocarbon removal for a constant level of stripping medium addition. Those skilled in the art can appreciate that the former will save utilities and facilities while the latter will provide more product and enhance regeneration operation.

In one embodiment, this invention is a stripping apparatus for an FCC unit that removes hydrocarbons from particulate catalyst by contact with a stripping gas. The stripping apparatus includes a vertically oriented elongated vessel that has a transverse cross-section open to catalyst flow and that admits catalyst at the top and discharges catalyst at the bottom. Two or more grids located in the vessel provide a baffle system. The grids have a horizontally projecting surface for moving the catalyst from side to side as it travels down the vessel. The horizontal projection of each grid is less than the transverse cross-section of the vessel. Together the horizontal projection of the grids substantially covers the entire transverse cross-section. Stripping gas is added below the lowermost grid and contacts the catalyst as it rises. Gas collection spaces, formed by the underneath side of each grid and one or more sidewalls, collects the upflowing stripping gas. The sidewalls attached to each grid includes at least one skirt that separates the gas collection space from the downward flowing catalyst. Each skirt contains two or more sets of apertures arranged in uniformly spaced horizontal rows of apertures. The apertures in each set are sized to produce a gas jet that injects the stripping gas from the gas collection space into the downward flowing stream of catalyst. Each aperture set has a different size opening to vary the jet length and distribute the stripping gas over the entire width of the downward flowing catalyst stream.

DETAILED DESCRIPTION OF THE INVENTION

Looking first at a more complete description of the FCC process, the typical feed to an FCC unit is a gas oil such as a light or vacuum gas oil. Other petroleum-derived feed streams to an FCC unit may comprise a diesel boiling range mixture of hydrocarbons or heavier hydrocarbons such as reduced crude oils. It is preferred that the feed stream consist of a mixture of hydrocarbons having boiling points, as determined by the appropriate ASTM test method, above about 232° C. and more preferably above about 288° C. It is becoming customary to refer to FCC type units which are processing heavier feedstocks, such as atmospheric reduced crudes, as RCC (residual crude cracking) units, or resid cracking units.

An FCC process unit comprises a reaction zone and a catalyst regeneration zone. In the reaction zone, a feed stream is contacted with a finely divided fluidized catalyst maintained at an elevated temperature and at a moderate positive pressure. Contacting of feed and catalyst may take place in a relatively large fluidized bed of catalyst. However, the reaction zones employed in modern FCC units are usually comprised of a vertical conduit, or riser, as the main reaction site, with the effluent of the conduit emptying into a large volume process vessel, which may be referred to as a separation vessel. The residence time of catalyst and hydrocarbons in the riser needed for substantial completion of the cracking reactions is only a few seconds. The flowing vapor/catalyst stream leaving the riser may pass from the riser to a solids-vapor separation device located within the separation vessel or may enter the separation vessel directly without passing through an intermediate separation apparatus. When no intermediate apparatus is provided, much of the catalyst drops out of the flowing vapor/catalyst stream as the stream leaves the riser and enters the separation vessel. One or more additional solids-vapor separation devices, almost invariably a cyclone separator, is normally located within and at the top of the large separation vessel. The products of the reaction are separated from a portion of catalyst which is still carried by the vapor stream by means of the cyclone or cyclones and the vapor is vented from the cyclone and separation zone. The spent catalyst falls downward to a lower location within the separation vessel. The stripper may comprise a lower part of the reaction zone (or separation vessel) or spent catalyst may be passed to a stripper separate from the reaction riser and separation vessel. Catalyst is transferred to a separate regeneration zone after it passes through the stripping apparatus.

The rate of conversion of the feedstock within the reaction zone is controlled by regulation of the temperature, activity of the catalyst, and quantity of the catalyst (i.e., catalyst/oil ratio) maintained within the reaction zone. The most common method of regulating the temperature in the reaction zone is by regulating the rate of circulation of catalyst from the regeneration zone to the reaction zone, which simultaneously changes the catalyst/oil ratio. That is, if it is desired to increase the conversion rate within the reaction zone, the rate of flow of catalyst from the regeneration zone to the reaction zone is increased. This results in more catalyst being present in the reaction zone for the same volume of oil charged thereto. Since the temperature within the regeneration zone under normal operations is considerably higher than the temperature within the reaction zone, an increase in the rate of circulation of catalyst from the regeneration zone to the reaction zone results in an increase in the reaction zone temperature.

The chemical composition and structure of the feed to an FCC unit will affect the amount of coke deposited upon the catalyst in the reaction zone. Normally, the higher the molecular weight, Conradson carbon, heptane insolubles, and carbon/hydrogen ratio of the feedstock, the higher will be the coke level on the spent catalyst. Also, high levels of combined nitrogen, such as found in shale-derived oils, will increase the coke level on spent catalyst. Processing of heavier feedstocks, such as deasphalted oils or atmospheric bottoms from a crude oil fractionation unit (commonly referred to as reduced crude) results in an increase in some or all of these factors and therefore causes an increase in the coke level on spent catalyst. As used herein, the term "spent catalyst" is intended to indicate catalyst employed in the reaction zone which is being transferred to the regeneration zone for the removal of coke deposits. The term is not intended to be indicative of a total lack of catalytic activity by the catalyst particles. The term "spent catalyst" is intended to have the same meaning as the term "used catalyst".

The reaction zone, which is normally referred to as a "riser" due to the widespread use of a vertical tubular conduit, is maintained at high temperature conditions which generally include a temperature above about 427° C. Preferably, the reaction zone is maintained at cracking conditions which include a temperature of from about 482° C. to about 593° C. and a pressure of from about 69 to 517 kPa (ga) but preferably less than about 276 kPa (ga). The catalyst/oil ratio, based on the weight of catalyst and feed hydrocarbons entering the bottom of the riser, may range up to 20:1 but is preferably between about 4:1 and about 10:1. Hydrogen is not normally added to the riser, although hydrogen addition is know in the art. On occasion, steam may be passed into the riser. The average residence time of catalyst in the riser is preferably less than about 5 seconds. The type of catalyst employed in the process may be chosen from a variety of commercially available catalysts. A catalyst comprising a zeolitic base material is preferred, but the older style amorphous catalyst can be used if desired. Further information on the operation of FCC reaction zones may be obtained from U.S. Pat. Nos. 4,541,922 and 4,541,923 and the patents cited above.

In an FCC process, catalyst is continuously circulated from the reaction zone to the regeneration zone and then again to the reaction zone. The catalyst therefore acts as a vehicle for the transfer of heat from zone to zone as well as providing the necessary catalytic activity. Catalyst which is being withdrawn from the regeneration zone is referred to as "regenerated" catalyst. As previously described, the catalyst charged to the regeneration zone is brought into contact with an oxygen-containing gas such as air or oxygen-enriched air under conditions which result in combustion of the coke. This results in an increase in the temperature of the catalyst and the generation of a large amount of hot gas which is removed from the regeneration zone as a gas stream referred to as a flue gas stream. The regeneration zone is normally operated at a temperature of from about 593° C. to about 788° C. Additional information on the operation of FCC reaction and regeneration zones may be obtained from U.S. Pat. Nos. 4,431,749; 4,419,221 (cited above); and 4,220,623.

The catalyst regeneration zone is preferably operated at a pressure of from about 34 to 517 kPa (ga). The spent catalyst being charged to the regeneration zone may contain from about 0.2 to about 5 wt. % coke. This coke is predominantly comprised of carbon and can contain from about 5 to 15 wt. % hydrogen, as well as sulfur and other elements. The oxidation of coke will produce the common combustion products: carbon dioxide, carbon monoxide, and water. As known to those skilled in the art, the regeneration zone may take several configurations, with regeneration being performed in one or more stages. Further variety is possible due to the fact that regeneration may be accomplished with the fluidized catalyst being present as either a dilute phase or a dense phase within the regeneration zone. The term "dilute phase" is intended to indicate a catalyst/gas mixture having a density of less than 320 kg/m$^3$. In a similar manner, the term "dense phase" is intended to mean that the catalyst/gas mixture has a density equal to or more than 320 kg/m$^3$. Representative dilute phase operating conditions often include a catalyst/gas mixture having a density of about 16 to 160 kg/m$^3$.

The further description of this invention is presented with reference to the drawings. These depict particular embodiments of the invention and are not intended to limit the generally broad scope of the invention as set forth in the claims.

Figure 1:
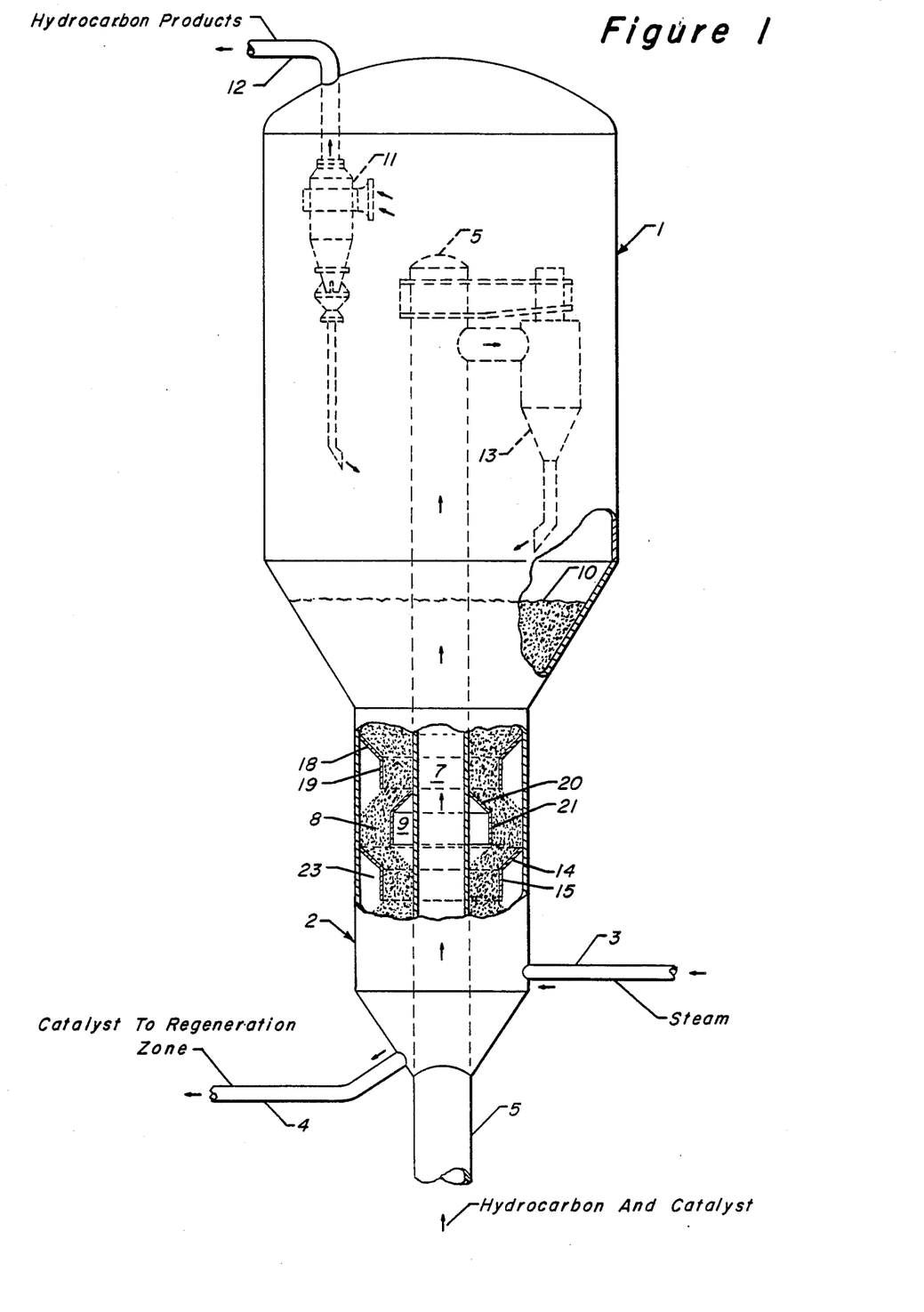
FIG. 1 schematically depicts an elevation view of an FCC process reaction and separation vessel whose lower portion is a stripping vessel or stripping section. Vessel internals are shown by dotted lines. Two partial sections are shown as cutaway portions.

FIG. 1 depicts one type of reaction zone which may be used to carry out an FCC process. The reaction zone is comprised of riser 5, separation vessel 1, and stripper 2 (or stripping vessel 2). Stripper vessel 2 is attached to the bottom portion of separation vessel 1 and riser 5 extends through the center of the stripper and into the separation vessel. Catalyst and hydrocarbon vapors flow upward in riser 5; reference number 7 denotes the interior of riser 5. The points where catalyst and hydrocarbon vapor are introduced into riser 5 are not shown. The fluidized mixture flows out of riser 5 and most of the catalyst separates from the gas stream in cyclone 13. This catalyst falls to the lower region of separation vessel 1 above the stripper section. Reference number 10 denotes the level of catalyst in the lower region. Vapor and some catalyst exit from the top of cyclone 13 and, along with the vapor from the stripper, enter cyclone 11. Fines, that is, small catalyst particles, which are entrained in the vapor stream are separated out in cyclone 11 and fall in a downward direction. The vapor stream comprising hydrocarbon products leaves cyclone 11 by means of pipeline 12. The hydrocarbon products in pipeline 12 are passed to appropriate product recovery facilities (not shown), which are normally comprised of a fractionation column referred to as the main column and other separatory equipment normally referred to as a gas concentration unit. There are numerous configurations for the vapor-solids separation equipment located inside separation vessel 1 other than the two cyclones shown in FIG. 1.

Spent catalyst moves downwardly from the lower region of separation vessel 1 into stripping vessel 2. Stripping vessel 2 is oriented in a principally vertical direction so that gravity flow will move the catalyst through the stripper vessel. The elongated shape provides vertical length to detain catalyst in the stripping vessel for a desired period of time. The outer wall of riser 5 and the interior of vessel 2 form an annular area through which the catalyst flows in a stream denoted by reference number 8. This annular area which is open to catalyst flow is more generally referred to as the transverse cross-sectional area. Catalyst is removed from the bottom of stripper 2 by conduit 4, which provides means for withdrawing catalyst particles, and passed to the regeneration zone (not shown) for removal of coke.

Figure 2:
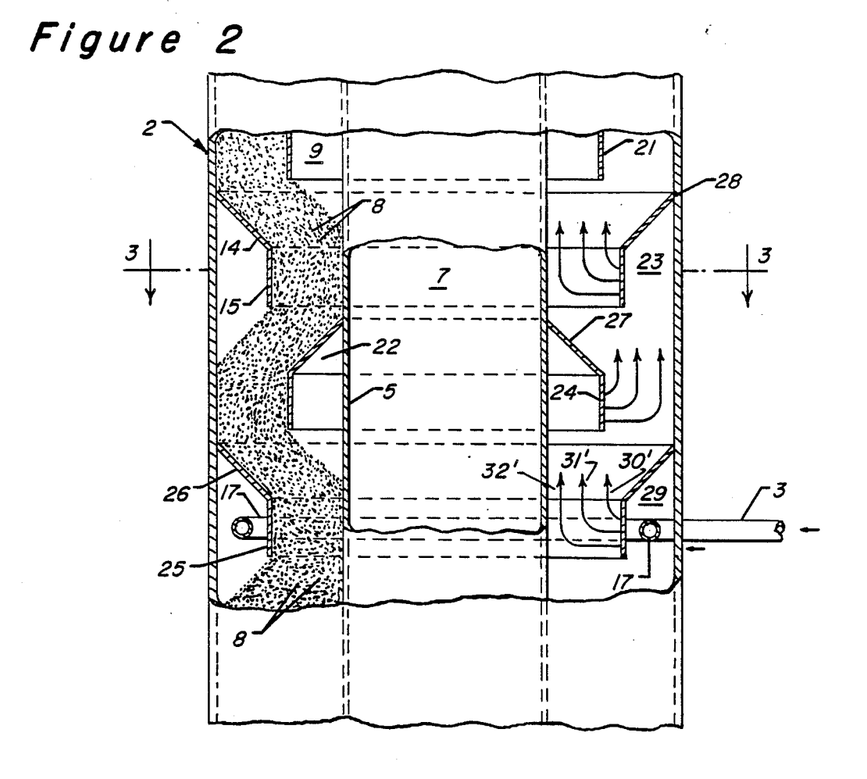
FIG. 2 is a vertical section of a portion of the stripping section of FIG. 1.
Figure 3:
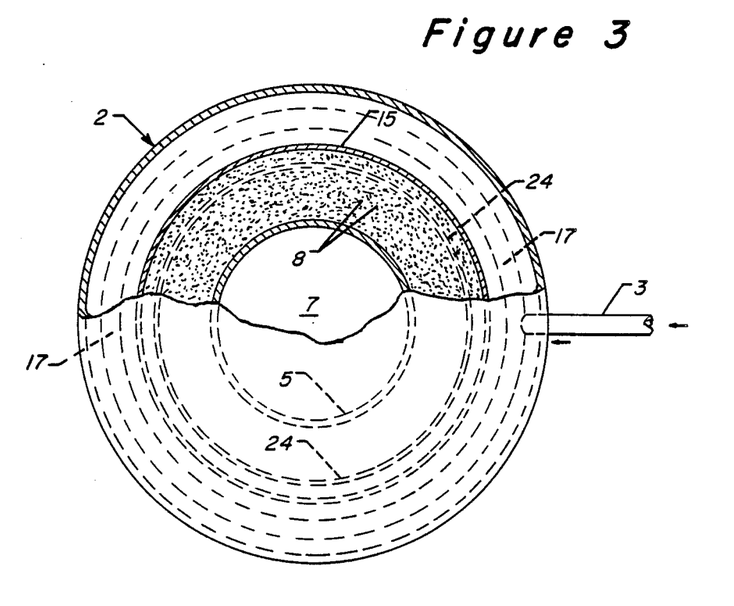
FIG. 3 is a plan view of the stripper of FIG. 2 taken at section 3—3.

FIG. 1 depicts a series of baffles located in the annular space. The baffles are made of grid members 18, 20, and 14 and a skirt 19, 21, and 15 attached to each grid. The term "grid" is commonly used in the industry and therefore "grid" or "grid member" is used herein. The term "grid" or "grid member" refers to means for diverting catalyst flow in a side-to-side manner as it flows downward under the influence of gravity in a stripper. A grid may be one of a variety of geometric forms. The drawings show various forms of grids. For example, grid 14 extends completely around the stripper in a horizontal manner and is attached to the inner surface of the stripper around the entire perimeter of the stripper. Grid 20 extends completely around the stripper and is attached to the outer surface of the riser along the entire perimeter of the riser. All of grids 18, 20, and 14 have frusto-conical shapes that extend downwardly into the annular area. The three grid members depicted in FIG. 1 each have a skirt attached to the grid member (19, 21, and 15) which is attached to the lowermost edge of the grid and extends downward. The skirts are formed to match the curve at the lower edge of the grid to which it is attached. For example, each skirt in FIGS. 1 and 2 is cylindrical in form. As shown in FIG. 3, each grid projects horizontally across the annular area.

FIG. 3 depicts stripper 2 and shows riser 5 concentric with the shell of stripper 2. Reference number 7 denotes the interior of riser 5. The FIG. 3 section is taken so that skirt 15 is shown. The dotted lines depict the position of skirt 24. Note that the diameter of skirt 24, and the other skirts attached to the grids associated with riser 5, is slightly less than that of skirt 15, and the other skirts attached to the grids associated with the outside wall, thus allowing the assembly consisting of riser 5 and the grid members and skirts associated with riser 5 to be removed in an upward direction.

Obviously, the horizontally projected area of each grid must fall far short of covering the entire annular area to permit catalyst flow. The total horizontal projection of any individual grid will usually equal 40 to 80 percent of the transverse cross-section. Collectively, the horizontal projection of the grids will substantially cover the transverse cross-sectional area. By substantially covering the annular transverse cross sectional area, the grids increase contact between the catalyst and stripping gas. This grid arrangement forces the catalyst to move from side-to-side and eliminates any unobstructed vertical flow path for the catalyst or stripping gas. The arrangement of the grids is described as substantially covering the flow path in recognition of a common form of stripper construction wherein the inner grids 20, 27 are attached to the riser 5 before insertion of the riser into the stripper. To permit later insertion of the riser and inner grid assembly into the stripper, the outside diameter of the inner grids is made slightly smaller than the inside diameter of the outer grids. This leaves an open annular space between the grids, shown in FIG. 3 between skirts 15 and 24. FIG. 3 exaggerates this space which is usually on the order of 2.5 to 5.0 cm. Since the stripping vessel usually has an overall minimum diameter of 1.5 meters, the direct flow area associated with this spacing is insignificant.

FIGS. 1 and 2 depict a space devoid of densely packed catalyst underneath the grid members. This space is denoted as 9, 22, 23, and 29 for grids 20, 27, 14, and 26, respectively. The spaces are gas collection spaces that, in a manner hereafter described, collect upflowing stripping gas. Gas collection spaces 23 and 29 are formed by the underside of the grid and a pair of sidewalls consisting of the skirt on one side and the vessel wall on the other side. Gas collection spaces 9 and 22 are formed by the underside of the grid and a pair of sidewalls including the vessel skirt and the outside of riser 5.

Figure 4:
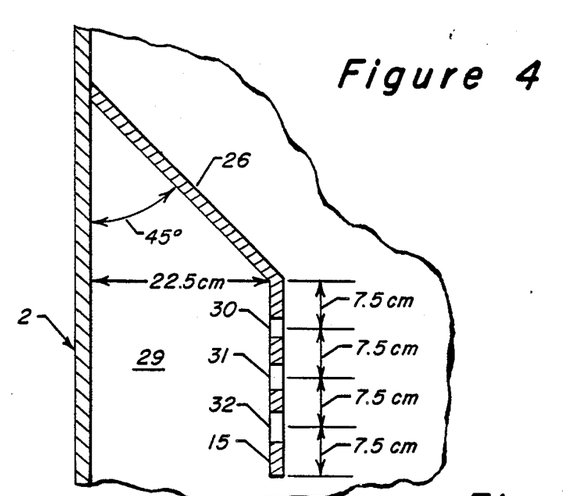
FIG. 4 is an enlarged view of one of the grid members of FIG. 2.

Grid member 14 may be used as an example of a portion of grids that also includes grids 18 and 26. These may be denoted outer grids. It extends 360° around the stripper and is attached to the inside of the wall of the stripper vessel in a sealable manner so that gas and catalyst cannot pass between the upper edge of grid member 14 and the inner wall of the stripper. Reference number 28 of FIGS. 2 and 4 shows the point of attachment; since FIG. 4 is a sectional view, attachment is continuous or 360° around the perimeter of the stripper vessel. Grid member 27 may be used as an example of the portion of the grids that also includes grid 20. These may be denoted inner grids. It is attached to the outside of riser 5 and extends 360° around riser 5. Skirts 19, 21, 15, 24, and 25 are shown in FIGS. 1 and 2. It should be noted that the total number of grids depicted in FIGS. 1 and 2 has been arbitrarily chosen and fewer or more grid members may be required in a given application.

Stripping gas is added to the stripping vessel below the lowermost grid. Steam is most commonly used as the stripping gas. After the stripping gas contacts the catalyst, it becomes mixed with hydrocarbon vapors that have been stripped from the catalyst. The term "stripping gas" refers to the gas that is injected into the riser as well as the mixture of hydrocarbons and injected gas that is found at higher elevations in the stripper. Catalyst is shown in the left-hand portion of the annular space 8 depicted in FIG. 2 and is present in the right-hand portion but is not shown in the drawing. The right-hand portion of FIG. 2 shows arrows which indicate the direction of flow of stripping gas out of apertures in the skirts that comprise a series of ports and through the catalyst. FIG. 4 depicts grid member 26 and skirt 25 in vertical section with ring 17 omitted. Skirt 26 contains stripping gas distribution ports, denoted by reference numbers 30, 31, and 32 of FIG. 4. Each skirt depicted in FIGS. 1 and 2 has a plurality of ports, though, for drawing convenience, they are not shown. It can be seen that catalyst flows in a side-to-side manner as it moves downward under gravitational force. The gas collection spaces 29, 22, 23, and 9 are relatively free of catalyst because it cannot flow in an upward direction. The angle at which catalyst falls away from the bottom of a skirt, that is, the angle at which a material will rest on a pile, is called the angle of repose. The angle of slide is a related concept. It may be defined as the minimum angle at which a material will flow from rest on an inclined surface. Each grid member is shown as having a downward slope greater than the angle of slide. This slope prevents catalyst from piling up on the top of the grid in an inclined bank.

The gas distribution ports evenly distribute stripping gas so that it contacts substantially all of the catalyst adjacent to each grid member skirt and, therefore, all of the catalyst in the stripper. Referring again to FIG. 2, stripping gas enters distributor pipe 17 by means of pipeline 3. Pipeline 3 is also shown in FIGS. 1 and 3. Distributor pipe 17 is shown in FIG. 3. Distributor pipe 17 is in the form of a ring which extends 360° around the stripper underneath grid member 26. The distributor is perforated in order to uniformly distribute steam in the annular space 29, which is under grid 26 and bounded by skirt 25. It is not necessary that gas distribution means comprising a ring be used; any apparatus which distributes steam in the space underneath the lowermost grid and skirt may be used. Stripping gas (steam) flows through the ports in skirt 25 (not shown) and then through the catalyst as depicted by the arrows on the right-hand side of FIG. 2. Steam and hydrocarbon vapors stripped from the catalyst adjacent to grid 26 and skirt 25 flow into the space 22 which is underneath grid member 27 and bounded by skirt 24. The gas is then redistributed through ports in skirt 24 and flows through catalyst adjacent to skirt 24 to enter space 23 underneath grid member 14. The gas then flows through ports in skirt 15 and through the rest of the stripper. Stripping gas and hydrocarbon vapors leaving the stripping section flow through the catalyst in the bottom of vessel 1, into the free space of vessel 1, and leave vessel 1 via cyclone 11 in combination with the hydrocarbon products of the FCC unit.

Figures 5, 6, 7, 8:
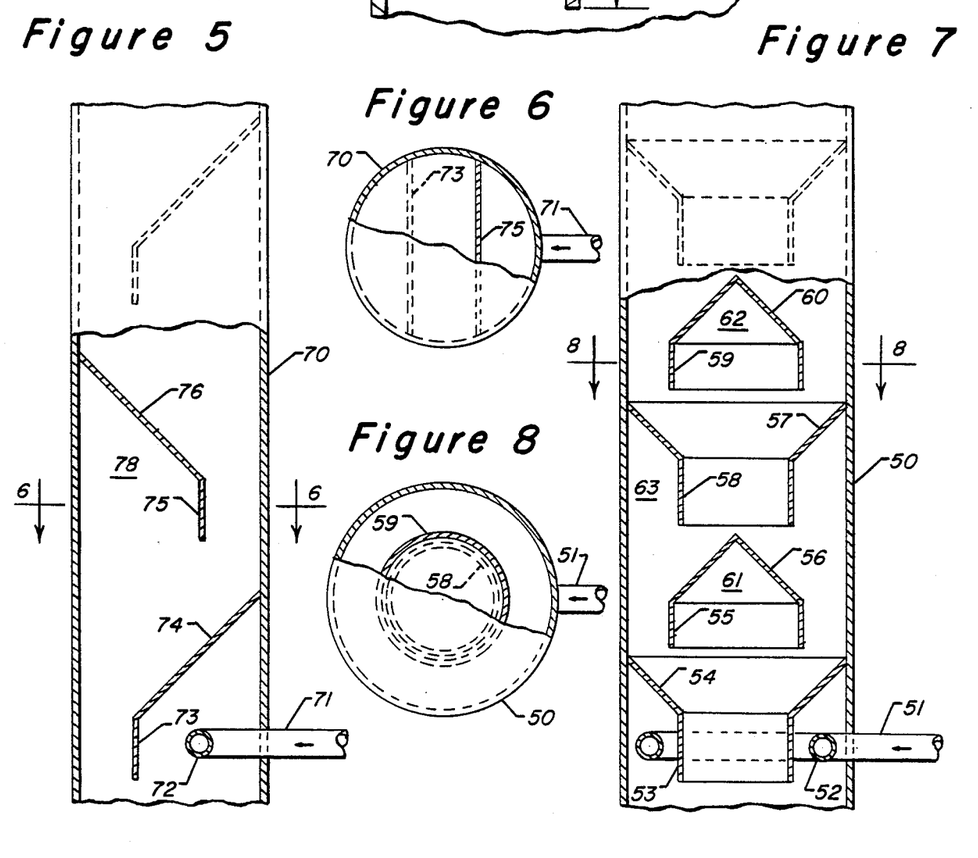
FIGS. 5 and 7 are sectional elevations of stripping devices having alternate baffle configurations.
FIGS. 6 and 8 are corresponding sectional views of the stripping devices shown in FIGS. 5 and 7.

FIGS. 5 and 6 depict catalyst diversion means in a cylindrical stripping zone. FIG. 6 is a top sectional view taken as shown by the sectional arrows in FIG. 5. In this case, the grid members are flat plates having a segment removed to permit downward flow of catalyst. The plates are placed at an angle greater than the angle of slide of the catalyst. Reference number 70 depicts the cylindrical shell of the stripper. Skirts 75 and 73 are attached to grid members 76 and 74. In this embodiment of the invention, the skirts are not curved, but are in the shape of a rectangle, as can be seen by the depiction of skirt 75 in FIG. 6. The dotted line of FIG. 6 depicts skirt 73. Stripping gas is supplied by pipeline 71 to distributor 72, from which it is distributed so that it will flow uniformly through ports in skirt 73 (not shown). In this embodiment of the invention, distributor 72 need not be in the form of a ring; it can be seen that a straight length of pipe will suffice. Gas passes through the catalyst adjacent to skirt 73, into the space 78 under grid 76, and then through the ports of skirt 75 (not shown). In a similar manner, gas passes through the rest of the stripper before entering a separation vessel similar to vessel 1 of FIG. 1.

FIGS. 7 and 8 depict another type of catalyst diversion means in a cylindrical vessel. Outer grid members, such as grid 57, are identical to the outer grid members depicted in FIGS. 1 and 2, such as outer grid 14. As in FIGS. 1 and 2, outer grid members of FIG. 7 extend 360° in a horizontal manner around stripper vessel 50. The skirts depicted in FIG. 7, such as skirt 58, are identical to the skirts depicted in FIGS. 1 and 2 which are attached to outer grids. Also, stripping gas is delivered to the stripper by pipeline 51 and distributed by distributor ring 52 in the same manner as in FIG. 2 (pipeline 3 and distributor 17). Central grid members, denoted by reference numbers 56 and 60, are disposed within stripper 50. Each central grid member is a hollow cone without a base and has a skirt, such as skirt 55, attached to its lowermost edge. Each skirt is a vertical hollow cylinder having a small height dimension. Legs (not shown) extending from each central grid member to an outer grid member provide support for the central grids. FIG. 8 depicts the cylindrical shell of stripper 50 and skirt 59. The dotted line of FIG. 8 depicts the location of skirt 58, which is attached to grid 57. Gas from distributor 52 flows through the ports (not shown) in skirt 53 and through the catalyst (not shown) adjacent to skirt 53 and grid 54 to the space underneath grid 56 which is denoted by reference number 61. Gas then flows through the ports (not shown) in skirt 55 up through catalyst (not shown) adjacent to skirt 55 and grid 56 and enters space underneath grid 57 denoted by reference number 63. From there, it flows through ports (not shown) in skirt 58 and into space 62 which is beneath grid 60 and bounded by skirt 59. Gas flows through the remainder of vessel 50 in a similar manner.

The height of a skirt and the number and size of the gas distribution ports contained therein are dependent upon a number of factors, such as the geometry of the stripper, rate of catalyst throughput, operating pressure, stripping gas flow rate, etc. Those skilled in the art are capable of determining the required rate of flow of stripping gas for a particular unit when the present invention is not practiced. This determination is based mainly on experience with stripping apparatus, since rigorous methods of calculation are not available.

The required rate of flow of stripping gas when the present invention is not practiced is the starting point for determining the parameters of the present invention. One-half of this flow is taken as the design flow rate and the ports are sized using this design rate. Those skilled in the arts of chemical engineering and hydrocarbon processing are capable of calculating pressure drops when gas is flowing through orifices and beds of particles. A trial arrangement and size, or sizes, of ports is selected. The total pressure drop across the stripper is then calculated. If this pressure drop is not satisfactory, different port characteristics are selected and the process is repeated. The skirt height is dependent primarily on the characteristics of the ports, but should be no less than 10 cm.

FIG. 4 shows the dimensions of a typical grid member and skirt. The height of the skirt is 30. cm and there are three rows of holes at three different elevations, each row being in a horizontal plane and extending 360° around the skirt. Providing more rows of holes increases the effectiveness of the invention by giving a more complete distribution of stripping. However, the invention only needs two rows of holes to be effective. The vertical separation between each row of holes is 7.5 cm. Each row contains 24 holes spaced 15 degrees apart so that all of the holes are evenly spaced. The holes have varying sizes to alter the jet length created by each row of holes. As an example of gas distribution ports having varying sizes, each of the ports in the row containing port 30 may be 1.27 cm in diameter, those ports in the row containing port 31 may be 1.9 cm in diameter, and those ports in the row containing port 32 may be 2.54 cm in diameter. Varying the diameter in this manner yields better coverage of the catalyst since the varying jet length distributes stripping gas over more of the catalyst stream. Referring again to both FIGS. 1 and 2, the lower set of arrows on the right-hand side of FIG. 2 have been labeled with primed reference numbers corresponding to the holes in FIG. 4. Gas flowing through the 1.27 cm port will flow a short distance in a somewhat horizontal direction before moving upward. Gas from a larger port, port 31, will flow further in a horizontal direction as shown by arrow 31. Gas from the largest hole will travel the longest horizontal distance, as shown by the arrow labeled 32. The horizontal distance for gas flow associated with a port is dependent on the size of the port, other parameters being equal.

In addition to improving the hydrocarbon yield by removing hydrocarbons which would be burned along with the coke, the present invention allows a lesser quantity of stripping steam to be used. For example, in a process where approximately 1.5 kg of steam is required for each 1000 kg of catalyst without practice of the present invention, experimentation has shown that use of 0.7 kg of steam per 1000 kg of catalyst yields satisfactory results when the present invention is utilized.

As an example of stripper dimensions, a relatively small FCC unit to which is provided 20,000 bpd (132.48 m³/hr) of feed may have a stripping section with a nominal diameter of 198.1 cm and a riser with a nominal diameter of 76.2 cm. Thus, the width, taken in a radial direction, of the annular space would be 60.9 cm. Referring now to FIG. 2, the width of the annular space taken in a radial direction under grid 14 might be 22.8 cm while the width of an inner grid would be about 35.5 cm. It is necessary to use differing widths because it is desired to maintain the horizontal area for catalyst flow relatively constant as the catalyst moves from side-to-side. This can be appreciated by reference to FIGS. 2 and 3 where it can be seen that the catalyst flows first in the inner annulus bounded by the members bearing reference numbers 15 and 5 and then in the outer annulus bounded by the members bearing reference numbers 2 and 24.

It may be desired to increase the size of the ports in the skirts located in the upper portion of a stripper in order to accommodate stripped hydrocarbon vapor. Port size may be varied from the smallest in the lower end to the largest in the upper end. For example, the ports in skirt 21 of FIG. 2 may be larger than the ports in skirt 25 of FIG. 2, in order to accommodate the hydrocarbon vapor that is flowing through the ports in skirt 21. It can be seen that virtually no hydrocarbon vapor will flow through the ports of skirt 25 and that the amount of hydrocarbon vapor which will flow through a port increases as the height above the steam distributor increases.

What is claimed is:

1. A stripping apparatus for an FCC unit that removes hydrocarbons from a continuously circulating stream of fluidized particulate catalyst by contact with a stripping gas, said apparatus comprising:
   (a) a vessel having an elongated shape, a principally vertical orientation, a transverse cross-section open to downward catalyst flow, an uppermost end in communication with a source of catalyst particles and a lowermost end in communication with a means for withdrawing catalyst particles;
   (b) a set of grids located within said vessel comprising at least one outer grid having a frusto-conical shape and an outer diameter portion fixed to the inside of said vessel at a first locus, said outer grid extending inwardly and downwardly from said first locus to an inner diameter portion, and at least one inner grid having an at least partially conical shape and an outer diameter portion at least substantially equal in size to the inner diameter portion of said outer grid, such that together said inner grid and said outer grid substantially cover said transverse cross-section, said inner grid extending inwardly and upwardly from its outer diameter portion to a means for supporting said inner grid, with all of said inner grids and said outer grids being vertically offset in an alternating pattern to provide a flow path for a stream of catalyst to flow down said vessel;
   (c) means for adding stripping gas to said vessel below the lowermost of said grids and withdrawing stripping gas from said uppermost end of said vessel;
   (d) at least one outer grid skirt having a cylindrical shape and an uppermost portion, each outer skirt being respectively fixed to said inner diameter portion of each of said outer grids, wherein each of said at least one outer grid skirt, outer grid, and vessel form an outer gas collection space having an open bottom for receiving stripping gas;
   (e) at least one inner grid skirt having a cylinder-shape and an uppermost portion, each inner skirt being respectively fixed to said outer diameter portion of each of said inner grids, wherein each of said at least one inner grid skirt, said inner grid and said means for supporting said inner grid form an inner gas collection space; and (f) at least two sets of apertures defined in each grid skirt, each set of apertures having a uniform aperture size, a uniform spacing between apertures, and a common vertical elevation for all apertures associated therewith, each aperture in each set having a horizontal centerline projection and a diameter of restricted size to produce a gas jet that extends into said flow path with the apertures in the lowermost aperture set on each skirt having the largest diameter so that the apertures of the lowermost aperture set will produce the longest jet length.

2. The apparatus of claim 1 wherein each grid skirt defines at least three sets of apertures and the diameter of the largest aperture is sized to extend the gas jet associated therewith at least two-thirds of the distance across said flow path for a stream of catalyst.

3. A stripping apparatus for an FCC unit that removes hydrocarbons from particulate catalyst by contact with a stripping gas, said apparatus comprising:

(a) a vessel having an elongated shape, a principally vertical orientation, a transverse cross-section open to downward catalyst flow, an uppermost end in communication with a source of catalyst particles and a lowermost end in communication with a means for withdrawing catalyst particles;

(b) at least two grids located in and extending downwardly and inwardly from opposite vertical sides of the vessel, each grid extending inwardly over at least about half of said transverse cross-section such that together said grids substantially cover said transverse cross-section, and said grids being offset vertically to provide a flow path for a stream of catalyst to flow downwardly through said vessel;

(c) means for adding stripping gas to said vessel below the lowermost of said grids;

(d) a vertical skirt attached to the bottom of each grid, said grid, skirt, and vessel forming a gas collection space underneath each grid for receiving stripping gas; and (e) at least two sets of apertures defined in each grid skirt, each set of apertures having apertures of a uniform size, a uniform spacing between apertures, and a common vertical elevation for all apertures associated therewith, each aperture in each set having a horizontal centerline projection and a diameter of restricted size to produce a gas jet that extends into said flow path with the apertures in the lowermost aperture set on each skirt having the largest diameter so that the apertures of the lowermost aperture set will produce the longest jet length.

4. The apparatus of claim 3 wherein each skirt defines at least three sets of apertures and the gas jet of the largest aperture extends at least two-thirds of the distance across said flow path for a stream of catalyst.

* * * * *